US010701944B2

(12) United States Patent
Woo et al.

(10) Patent No.: US 10,701,944 B2
(45) Date of Patent: Jul. 7, 2020

(54) METHOD OF PRODUCING FROZEN DOUGH FOR BREAD CONTAINING FILLING AND METHOD OF PRODUCING CREAM-FILLED BREAD BY EMPLOYING THE FROZEN DOUGH

(71) Applicant: PARIS CROISSANT CO., LTD., Seongnam-si (KR)

(72) Inventors: Jung Ho Woo, Incheon (KR); Hong Shin Jeon, Seoul (KR); Dae Chul Kim, Anyang-si (KR); Young Kyu Lee, Hwaseong-si (KR)

(73) Assignee: PARIS CROISSANT CO., LTD., Seongnam-si (KR)

( * ) Notice: Subject to any disclaimer, the term of this patent is extended or adjusted under 35 U.S.C. 154(b) by 71 days.

(21) Appl. No.: 16/072,496

(22) PCT Filed: Jan. 26, 2017

(86) PCT No.: PCT/KR2017/000928
§ 371 (c)(1),
(2) Date: Jul. 24, 2018

(87) PCT Pub. No.: WO2017/131454
PCT Pub. Date: Aug. 3, 2017

(65) Prior Publication Data
US 2019/0029274 A1   Jan. 31, 2019

(30) Foreign Application Priority Data

Jan. 29, 2016 (KR) .......................... 10-2016-0011720

(51) Int. Cl.
| | |
|---|---|
| *A21D 13/19* | (2017.01) |
| *A21D 13/14* | (2017.01) |
| *A21D 13/31* | (2017.01) |
| *A23C 13/14* | (2006.01) |
| *A21D 8/06* | (2006.01) |
| *A21D 15/02* | (2006.01) |
| *A21D 8/02* | (2006.01) |
| *A21D 10/02* | (2006.01) |
| *A21D 6/00* | (2006.01) |
| *A21D 10/00* | (2006.01) |

(52) U.S. Cl.
CPC ............. *A21D 13/31* (2017.01); *A21D 6/001* (2013.01); *A21D 8/02* (2013.01); *A21D 8/06* (2013.01); *A21D 10/002* (2013.01); *A21D 10/02* (2013.01); *A21D 15/02* (2013.01); *A23C 13/14* (2013.01)

(58) Field of Classification Search
CPC ...... A21D 2/368; A21D 10/002; A21D 13/40;
A21D 8/06; A21D 13/80; A21D 13/31;
A21D 10/02; A21D 13/30; A21D 13/38;
A21D 15/02; A21D 8/02; A21D 13/14;
A21D 13/16; A21D 13/19
See application file for complete search history.

(56) References Cited

U.S. PATENT DOCUMENTS

| 8,053,006 B2 * | 11/2011 | Lee | ........................ | A21D 6/001 426/19 |
|---|---|---|---|---|
| 2004/0076716 A1 | 4/2004 | Cooper | | |
| 2010/0255151 A1 | 10/2010 | Lee | | |
| 2013/0004643 A1 | 1/2013 | Park | | |

FOREIGN PATENT DOCUMENTS

| CN | 101744181 B | 6/2010 | |
|---|---|---|---|
| EP | 0927518 A1 | 7/1999 | |
| JP | 2990641 B2 | 12/1999 | |
| KR | 20030014009 A | 2/2003 | |
| KR | 10-2003-0075666 A | 9/2003 | |
| KR | 100942611 B1 * | 2/2010 | ............. A21D 13/00 |
| KR | 10-1087810 B1 | 11/2011 | |
| KR | 10-1684825 B1 | 12/2016 | |

OTHER PUBLICATIONS

KR 100942611, Machine Translation, English Abstract (Year: 2010).*
International Search Report for PCT/KR2017/000928 dated Apr. 26, 2017; 5 pages including English translation.
Naver Blog, "Sweet Combination of Custard Cream and Red Bean Paste" Nov. 21, 2006, available on the Internet at <URL: http://blog.naver.com/urdu02/50011094606>, including English translation.
"How to Make a Pate a Choux & Fill Éclairs and Cream Puffs" dated Aug. 19, 2009; downloaded from the Internet on Jun. 28, 2019 at <URL: https://www.browneyedbaker.com/how-to-make-a-pate-a-choux-fill-eclairs-and-cream-puffs/>.
Extended European Search Report for EP Application No. 17744575.6 dated Jul. 10, 2019; 11 pages.

* cited by examiner

*Primary Examiner* — Hong T Yoo
(74) *Attorney, Agent, or Firm* — Schwabe Williamson & Wyatt, PC

(57) ABSTRACT

The present invention relates to a method of producing frozen dough for bread containing a filling and a method of producing cream-filled bread by employing the frozen dough. More particularly, the present invention relates to a method of producing cream-filled bread, which can produce soft textured bread even by employing frozen/refrigerated dough, and can maintain soft bread texture even after a long period of time.

5 Claims, No Drawings

METHOD OF PRODUCING FROZEN DOUGH FOR BREAD CONTAINING FILLING AND METHOD OF PRODUCING CREAM-FILLED BREAD BY EMPLOYING THE FROZEN DOUGH

CROSS-REFERENCE TO RELATED APPLICATION

The present application is a national phase entry under 35 U.S.C. § 371 of International Application No. PCT/KR2017/000928, filed Jan. 26, 2017, which claims priority from Korean Patent Application No. 10-2016-0011720 filed on Jan. 29, 2016 in the Korean Intellectual Property Office, and all the benefits accruing therefrom under 35 U.S.C. 119, which are herein incorporated by reference in their entireties and for all purposes.

BACKGROUND

1. Field of the Invention

The present invention relates to a method of producing frozen dough for bread containing a filling and a method of producing cream-filled bread by employing the frozen dough. More particularly, the present invention relates to a method of producing cream-filled bread, which can produce soft textured bread even by employing frozen/refrigerated dough.

2. Description of the Related Art

In general, bread containing a filling is shaped in a variety of patterns, like Crucian (carp), dinosaur, etc., to then be baked, and contains various types of fillings inside the bread, which can be optionally selected as refreshments according to taste preferences.

In such conventional filled bread, dough is prepared by mixing flour with salt, sugar and purified water, yielding watery dough. Otherwise, bread dough is prepared by reducing the amount of water. In a case where bread is baked based on the watery dough, instantly baked bread gives enjoyable crispy mouth feel. However, the crispiness may not last long with the passage of time due to the moisture contained in the watery dough. In other case where bread is baked based on water-reduced dough, there is no change in the texture of bread depending on the passage of time, but the bread has a low level of crispiness and becomes hardened.

In addition, retail bakers who sell bread directly to consumers may be different from suppliers of raw materials in most cases. In these situations, baked bread supplied as a finished product cannot be freshly kept. When paste-type dough is supplied, bread product quality may not be consistent.

SUMMARY

The present invention provides a method of producing frozen dough for bread containing a filling, which can while keeping bread fresh without lowering the quality of bread baked based on the frozen dough in a case where the bread is supplied to bakery retail outlets as finished products.

The present invention also provides a method of producing cream-filled bread which can retain its soft texture.

According to an aspect of the present invention, there is provided a method of producing frozen dough for bread containing a filling, the method including: preparing a first dough by mixing flour, salt, yeast, a baking improver, milk and water in predetermined proportions and kneading the mixture; measuring a temperature of the first dough, and when the temperature reaches 20 to 24° C., storing the first dough in a refrigerator maintained at a temperature in a range of 0 to 10° C. for 12 to 15 hours, to prepare a sponge dough; preparing a second dough by mixing the sponge dough with raw materials including flour, sugar, salt, eggs, a baking improver, butter, water and yeast; measuring a temperature of the second dough, and when the temperature reaches 25 to 30° C., firstly fermenting the second dough for 10 to 30 minutes; dividing the firstly fermented dough into a predetermined size of pieces; leaving the fermented dough pieces to be benched for a bench time of 5 to 15 minutes; inserting a filing into each benched dough piece in a weight ratio of 20 to 40:40 to 60 and enclosing the resulting dough; and quickly freezing the filling-containing dough at a temperature in a range of −15 to 20° C.

The first dough may include 45.7 to 60% by weight of flour, 0.1 to 0.3% by weight of salt, 0.3 to 0.6% by weight of yeast, 0.2 to 0.4% by weight of a baking improver, 35.7 to 50% by weight of milk, and 1 to 3% by weight of water.

The ingredient proportions of the raw materials may be 40 to 47.6% by weight of flour, 15 to 22.6% by weight of sugar, 1.2 to 1.6% by weight of salt, 15 to 22.6% by weight of eggs, 0.2 to 0.8% by weight of a baking improver, 15 to 22.6% by weight of butter, 5 to 12.6% by weight of water, and 1 to 3% by weight of yeast.

According to another aspect of the present invention, there is provided a method of producing cream-filled bread, the method including: thawing the produced frozen dough to reach a temperature in a range of 15 to 20° C. and shaping the thawed dough; secondly fermenting the thawed dough for 60 to 70 minutes in a fermentation room conditioned at a temperature in a range of 28 to 35° C. and humidity of 70 to 95%; baking the second fermented dough at a temperature in a range of 150 to 230° C. for 6 to 10 to produce filled bread; cooling the baked filled bread at room temperature for 20 to 60 minutes; and injecting cream into a top surface of the cooled bread.

Effects of the Invention

As described above, in the method of producing frozen dough for filled bread according to the present invention, dough is supplied in a frozen state, bread can be directly baked and freshly kept even if it is baked at a bakery outlet remotely located from a dough manufacturer's place, and the quality of bread can be constantly maintained.

In addition, in the method of producing cream-filled bread according to the present invention, soft texture of the bread can be retained without being hardened with the passage of time.

DETAILED DESCRIPTION OF THE EMBODIMENTS

Hereinafter, the present invention will be described in more detail.
<Production Method of Frozen Dough>
The present invention provides a method of producing frozen dough for bread containing a filling, the method including preparing a first dough by mixing flour, salt, yeast, a baking improver, milk and water in predetermined proportions and kneading the mixture, measuring a temperature of the first dough, and when the temperature reaches 20 to 24° C., storing the first dough in a refrigerator maintained at a temperature in a range of 0 to 10° C. for 12 to 15 hours, to prepare a sponge dough, preparing a second dough by mixing the sponge dough with raw materials including flour, sugar, salt, eggs, a baking improver, butter, water and yeast, measuring a temperature of the second dough, and when the temperature reaches 25 to 30° C., firstly fermenting the second dough for 10 to 30 minutes, dividing the firstly fermented dough into a predetermined size of pieces, leaving the fermented dough pieces to be benched for a bench time of 5 to 15 minutes, inserting a filling into each benched dough piece in a weight ratio of 20 to 40:40 to 60 and enclosing the resulting dough, and quickly freezing the filling-containing dough at a temperature in a range of −15 to 20° C.

The term "room temperature" used herein means a temperature in a range of 1° C. to 30° C.

In the first dough preparation step, all ingredients of the first dough are mixed in predetermined proportions and kneaded at a low speed. Flour, salt, baking improver, milk, yeast, water and so on may be used as the dough ingredients.

In the kneading of the first dough, the first dough preferably includes 45.7 to 60% by weight of flour, 0.1 to 0.3% by weight of salt, 0.3 to 0.6% by weight of yeast, 0.2 to 0.4% by weight of a baking improver, 35.7 to 50% by weight of milk, and 1 to 3% by weight of water.

The flour is a main ingredient of dough, and strong flour, medium flour, or a combination of strong flour and medium flour may be used. The flour can be classified into strong flour, medium flour and weak flour according to the content of gluten. Strong flour contains 11% to 13.0% protein and is preferably used in producing pizza dough because it has high glutinosity when it is kneaded in water. Medium flour contains about 10% gluten. The medium flour may be used alone or in combination of strong flour and medium flour mixed in a weight ratio of 9:1 to 8:2. In the latter case, as the gluten content becomes about 11%, like semi-strong flour, the viscosity and resilience levels of dough can be appropriately adjusted, thereby advantageously obtaining both chewiness and soft texture at the same time.

The salt enhances tastes and flavors of other ingredients and controls fermentation of yeast. The salt is preferably used in amounts of 0.1 to 0.3 wt % in the first dough preparation step and 1.2 to 1.6 wt % in the second dough preparation step.

The sugar functions as a nutrient of yeast and imparts a sweet taste to the dough. The sugar is preferably used in an amount of 15 to 25 wt %. If the amount of sugar is less than 15 wt %, fermentation of the yeast may not be sufficiently carried out due to a lack of nutrients and the moisture-holding capacity and sweetening level of bread may be lowered. If the amount of sugar is greater than 25 wt %, sweetening and browning reaction may be elevated and the flavor and appearance of finished bread may be degraded. In this case, however, free water contained in bread is strongly attracted to sugar to then be converted into bonded water, and retrogradation of a finished bread product may be retarded compared to a case where a smaller amount of sugar is used, thereby increasing the softness of the product.

The yeast is a bread leavening agent causing alcohol fermentation when it is added to flour having sugar or nutrient added moisture, and controls and ripens dough to enhance the flavor of bread. Fresh yeast, dry yeast, or freeze-dried yeast may be used as the yeast.

The butter can maintain the soft texture of bread even with the passage of time when it is added in an amount of 15 to 30 wt %. If the amount of butter exceeds 30 wt %, it may be difficult to maintain the shapability of bread.

The water functions to adjust the viscosity of dough, uniformly disperses various ingredients, and hydrates and swells starch. The water is preferably used in amounts of 1 to 3 wt % in the first dough preparation step and 5 to 15 wt % in the second dough preparation step.

The baking improver includes wheat flour, glucose, calcium carbonate, food additives (glycerin fatty acid ester, calcium carbonate, etc.) and cereal mixture (including flour, vitamin C and enzyme), and any type of commercially available improvers can be used.

In the sponge dough preparation step, the first dough temperature is measured and stored at a refrigerator maintained at a temperature in a range of 0 to 10° C. for 12 to 15 hours when the first dough temperature reaches 20 to 24° C., thereby preparing the sponge dough. In the present invention, a ripening step is carried out when the sponge dough is prepared.

Thereafter, second dough is prepared by mixing the sponge dough with raw materials including flour, sugar, salt, eggs, a baking improver, butter, water and yeast. If the sponge dough is in an extremely greater amount than the raw materials, excessive fermentation may occur. In contrast, if the sponge dough is in an extremely smaller amount than the raw materials, the quality of finished bread based on the smaller amount of the sponge dough may be lowered.

The raw materials include flour, sugar, salt, eggs, a baking improver, butter, water and yeast. The ingredient proportions of the raw materials are 40 to 47.6% by weight of flour, 15 to 22.6% by weight of sugar, 1.2 to 1.6% by weight of salt, 15 to 22.6% by weight of eggs, 0.2 to 0.8% by weight of a baking improver, 15 to 22.6% by weight of butter, 5 to 12.6% by weight of water, and 1 to 3% by weight of yeast.

Then, a temperature of the second dough is measured, and when the temperature reaches 25 to 30° C., the second dough is firstly fermented for 10 to 30 minutes. When the amounts of the raw materials used are increased, less leavening by fermentation is desirable.

Next, the firstly fermented dough is divided into a predetermined size of pieces, each having a predetermined size. The dividing can be appropriately selected by one skilled in the related art according to the size of bread intended to produce, for example, each dough piece weighing 30 g to 70 g.

The fermented dough pieces are left to rest for a bench time of 5 to 15 minutes. During the bench time, the divided dough pieces are covered by plastic wraps, etc. for fermentation. The bench time is given for the purpose of reorganizing gluten strands as a preliminary step for making it easier to shape the dough in the next step. Here, the bench time is adjustably given such that it is extended for young dough and is shortened for exhausted dough, wherein the young dough is less relatively fermented and the exhausted dough is more fermented, compared to the normal fermentation.

A filling is inserted into each benched dough piece in a weight ratio of 20 to 40:40 to 60 and enclosed by the side of the benched dough piece. Various edible materials including, for example, red beans, soybeans, chestnuts, sweet potatoes, pumpkins, and so on, can be used as the filling.

The filling can be appropriately produced by one skilled in the related art according to characteristics of the respective materials. For example, a red bean filling may be produced by a process including the steps of adding 30 to 60 parts by weight of red beans to 100 parts by weight of water and steaming the red beans at a temperature in a range of 90 to 100° C. for 1 to 3 hours, and adding sodium bicarbonate, baking powder, sugar (black sugar and/or white sugar), and a starch solution, to the steamed red beans and then stirring the resulting mixture.

Cinnamon powder, pine tree powder, etc. may also be added according to tastes or preferences.

Next, the dough containing the filling is quickly frozen at a temperature in a range of −15 to 20° C., thereby finally producing frozen dough for filled bread.

The thus produced frozen dough can be delivered to bakery retail outlets to allow filled bread to be directly baked to produce cream-filled bread at the respective bakery outlets.

<Production Method of Cream-Filled Bread>

The method of producing cream-filled bread according to the present invention includes thawing the frozen dough for filled bread delivered in a frozen state to a temperature in a range of 15 to 20° C. and shaping the thawed dough, secondly fermenting the thawed dough for 60 to 70 minutes in a fermentation room maintained at a temperature in a range of 28 to 35° C. and humidity of 70 to 95%, baking the second fermented dough at a temperature in a range of 150 to 230° C. for 6 to 10 to produce filled bread, cooling the baked filled bread at room temperature for 20 to 60 minutes, and injecting cream into a top surface of the cooled bread.

In detail, the frozen dough for filled bread delivered in a frozen state is first thawed to a temperature in a range of 15 to 20° C. and then shaped again to be puffed. Here, the frozen dough may be appropriately molded to provide a desired bread shape.

The dough is secondly fermented for 60 to 70 minutes in a fermentation room conditioned at a temperature in a range of 28 to 35° C. and humidity of 70 to 95%.

The second fermented dough is baked at a temperature in a range of 150 to 230° C. for 6 to 10 minutes using an oven to produce filled bread. A top heat temperature of the oven is preferably higher than a bottom heat temperature. For example, the top heat temperature may be in a range of 210 to 230° C. and the bottom heat temperature may be in a range of 160 to 180° C.

According to an example embodiment of the present invention, a brightener solely used for bread may be applied to a surface of the secondly fermented dough. The brightener makes the bread shiny when it is applied to the surface of bread.

Thereafter, the baked filled bread is cooled at room temperature for 20 to 60 minutes. This step is carried out in consideration of characteristics of cream to be injected later. When any filling other than cream is intended to be injected, the cooling step may be omitted.

Then, cream is injected into a top surface of the cooled bread, thereby producing the cream-filled bread.

The thus produced cream-filled bread can be instantly packaged and delivered, and the soft texture of bread can be maintained without being hardened.

The cream injected into bread may be produced by a process including mixing fresh cream and sugar in a weight ratio of 100 to 150:5 to 10 and whipping the mixture to reach 800 to 900% in volume relative to the original volume before whipping, and preparing cream to be used as a filling by mixing the whipped cream with a custard content in a weight ratio of 50 to 80:80 to 120.

The custard content includes several ingredients including a custard mix, milk and vanilla bean, and is prepared by lightly mixing the ingredients.

EXAMPLES

The present invention will be understood in more detail with reference to examples and comparative examples and the following examples and comparative examples are provided only for illustrating the present invention, not for limiting the protection scope of the present invention.

Example 1

Preparation of Sponge Dough

The sponge dough was prepared by mixing 55% by weight of flour, 0.2% by weight of salt, 0.5% by weight of yeast, 0.3% by weight of a baking improver, 42% by weight of milk, and 2% by weight of water and kneading at low speed (90 rpm) for 10 to 20 minutes. The prepared sponge dough had an internal temperature (dough finishing temperature) was in a range of 20 to 25° C.

The obtained sponge dough was subjected to fermentation at room temperature for 1 to 3 hours and stored in a refrigerator for 12 to 15 hours.

Preparation of Frozen Dough

The sponge dough was mixed with raw materials including 45 wt % of flour, 15 wt % of sugar, 1.5 wt % of salt, 0.5 wt % of a baking improver, 15 wt % of eggs, 6 wt % of water, 2 wt % of yeast and 5 wt % of butter and kneaded at a low speed (90 rpm) for 2 to 5 minutes. Then, 10 wt % of butter was further added to the resultant product and kneaded again at a low speed (90 rpm) for 4 to 5 minutes to produce dough. The produced dough had an internal temperature (dough finishing temperature) was in a range of 20 to 24° C.

Next, the dough was subjected to second fermentation for 60 to 70 minutes at a temperature in a range of 28 to 35° C. and humidity of 70 to 95%. The dough was divided into pieces weighing 40 to 60 g using a divider. A bench time of 5 to 15 minutes is given to the divided dough pieces, and 20 to 40 g of a red bean filling was inserted into the center of the dough and enclosed. The filling-containing dough was quickly frozen at a temperature of −18° C.

Preparation of Cream-Filled Bread

The frozen dough was thawed to reach a temperature in a range of 15 to 20° C. and shaping the thawed dough into the shape of a red bean bread shape. Panning was performed using a flat baking pan such that side faces of the thawed dough might not come into contact with the pan. The thawed dough was secondly fermented for 60 to 70 minutes in a fermentation room conditioned at a temperature in a range of 28 to 35° C. and humidity of 70 to 95%. 0.5 g of a brightener was applied to a surface of the secondly fermented dough and baked at a temperature in a range of 150 to 230° C. for 6 to 10 using a deck oven to produce filled bread. The baked bread product was cooled at room temperature for 20 to 60 minutes, followed by injecting 10 to 20 g of cream to be used as a filling into the bread product.

Preparation of Cream to be Used in Cream-Filled Bread 100 g of fresh cream and 2 g of sugar were mixed and whipped to reach 800 to 900% in volume relative to the original volume before whipping. The cream to be used as a filling was prepared by mixing 50 g of the whipped cream with 80 g of a custard content. The custard content includes a custard mix and milk mixed in a mixing ratio of 1:2 and was prepared by lightly mixing the ingredients.

Experimental Example 1

12 housewives and 12 female college students were allowed to eat for 2 days the cream-filled (red bean filling) bread according to Example 1 of the present invention and red bean filled bread products commercially available in the market under two brand names 'EAT BREAD' and 'bread&co.' and to evaluate bread attributes and their preferences.

For attribute evaluation, each of 9 factors indicating bread palatability was scaled with scale 7 assessed for a perfect score, the 9 factors including (1) color, (2) odor/flavor, (3) softness, (4) bread moistness, (5) bread-filling balance in texture (6) overall mouthfeel, (7) texture taste of bread, (8) bread-filling balance in taste, (9) overall taste. Average values of data obtained from the 24 assessors are listed in Table 1. The higher average value means a higher palatability level.

Table 2 shows palatability levels expressed as percentages based on the scores obtained from the attribute evaluation.

TABLE 1

| | Bread type | Overall satisfaction | (1) | (2) | (3) | (4) | (5) | (6) | (7) | (8) | (9) |
|---|---|---|---|---|---|---|---|---|---|---|---|
| 12 housewives | Example 1 | 5.4 | 5.8 | 5.3 | 4.8 | 4.8 | 5.0 | 4.9 | 5.3 | 5.2 | 5.1 |
| | EAT BREAD | 4.5 | 5.7 | 4.9 | 4.1 | 4.4 | 4.4 | 4.4 | 4.5 | 4.7 | 4.5 |
| | bread&co. | 4.0 | 4.2 | 4.1 | 3.7 | 3.8 | 4.3 | 3.8 | 3.8 | 4.2 | 3.9 |
| 12 female college students | Example 1 | 5.0 | 6.0 | 5.3 | 5.0 | 4.7 | 5.2 | 4.9 | 4.9 | 5.3 | 5.1 |
| | EAT BREAD | 4.4 | 4.9 | 4.3 | 4.3 | 4.4 | 4.7 | 4.8 | 4.8 | 4.7 | 4.3 |
| | bread&co. | 3.8 | 3.8 | 3.7 | 3.3 | 3.3 | 4.4 | 3.6 | 3.6 | 4.3 | 3.8 |

TABLE 2

| | Example 1 | EAT BREAD | bread&co. |
|---|---|---|---|
| Housewives | 75.0% | 16.7% | 8.3% |
| Female college students | 58.3% | 33.3% | 8.3% |

As confirmed from Tables 1 and 2, the cream filled bread produced according to the present invention was evaluated to have desirable attributes in view of overall palatability levels, texture and flavor. That is to say, it is understood that the cream-red bean filled bread produced according to the present invention was evaluated to have a higher known satisfaction level than other bread manufacturers' red bean filled bread Even after the passage of time, there was no significant change in the texture of the cream-filled bread produced according to the present invention, but the texture and taste of the conventional filled bread were significantly changed. Therefore, it is understood that the cream-filled bread production method according to the present invention provides bread having better taste and texture than the conventional filled bread without experiencing a considerable change in the taste and texture with the passage of time.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A method of producing cream-filled bread, the method comprising:
   preparing a first dough by mixing flour, salt, yeast, a baking improver, milk and water in predetermined proportions and kneading the mixture;
   measuring a temperature of the first dough, and when the temperature reaches 20 to 24° C., storing the first dough in a refrigerator maintained at a temperature in a range of 0 to 10° C. for 12 to 15 hours, to prepare a sponge dough;
   preparing a second dough by mixing the sponge dough with raw materials including flour, sugar, salt, eggs, a baking improver, butter, water and yeast;
   measuring a temperature of the second dough, and when the temperature reaches 25 to 30° C., firstly fermenting the second dough for 10 to 30 minutes;
   dividing the firstly fermented dough into pieces each weighing 30 g to 70 g;
   leaving the fermented dough pieces to be benched for a bench time of 5 to 15 minutes;
   inserting a filling into the each benched dough piece in weight ratio of 20~40 to 40~60 and enclosing a filling-containing dough;
   quickly freezing the filling-containing dough at a temperature in a range of −15 to 20° C.;
   thawing the frozen dough to reach a temperature in a range of 15 to 20° C. and shaping the thawed dough;
   secondly fermenting the thawed dough for 60 to 70 minutes in a fermentation room conditioned at a temperature in a range of 28 to 35° C. and humidity of 70 to 95%;
   baking the second fermented dough at a temperature in a range of 150 to 230° C. for 6 to 10 minutes to produce a baked filled bread;
   cooling the baked filled bread at room temperature for 20 to 60 minutes; and
   injecting cream into the cooled, baked filled bread.

2. The method of claim 1, wherein the first dough comprises 45.7 to 60% by weight of flour, 0.1 to 0.3% by weight of salt, 0.3 to 0.6% by weight of yeast, 0.2 to 0.4% by weight of a baking improver, 35.7 to 50% by weight of milk, and 1 to 3% by weight of water.

3. The method of claim 1, wherein ingredient proportions of the raw materials are 40 to 47.6% by weight of flour, 15 to 22.6% by weight of sugar, 1.2 to 1.6% by weight of salt, 15 to 22.6% by weight of eggs, 0.2 to 0.8% by weight of a baking improver, 15 to 22.6% by weight of butter, 5 to 12.6% by weight of water, and 1 to 3% by weight of yeast.

4. The method of claim 1, wherein the filling is a red bean filling.

5. The method of claim 1, wherein the cream is prepared by a process comprising:
   mixing fresh cream and sugar in a weight ratio of 100 to 150:5 to 10 and whipping the mixture to reach 800 to 900% in volume relative to an original volume before whipping; and
   preparing the cream to be used as a cream filling by mixing the whipped cream with a custard content in a weight ratio of 50 to 80:80 to 120.

* * * * *